United States Patent [19]

Yoshigai

[11] Patent Number: 4,704,044

[45] Date of Patent: Nov. 3, 1987

[54] DEVICE FOR CONNECTING A WIRE WITH A COUPLING IN AN OPERATIVE ASSEMBLY OR IN AN ACTUATIVE ASSEMBLY FOR BICYCLE OR THE LIKE

[75] Inventor: Toshiharu Yoshigai, Osaka, Japan

[73] Assignee: Yoshigai Kikai Kinzoku Kabushiki Kaisha, Osaka, Japan

[21] Appl. No.: 839,168

[22] Filed: Mar. 13, 1986

[30] Foreign Application Priority Data

Mar. 14, 1985 [JP] Japan .................................. 60-51387

[51] Int. Cl.⁴ ........................... F16D 1/12; A44B 1/04
[52] U.S. Cl. ....................................... 403/79; 403/150; 403/165; 403/353; 403/406.1; 24/573; 24/657
[58] Field of Search .................... 403/74, 79, 150, 154, 403/406.1, 405.1, 353, 165, 164, 78, 57, 58, 354, 375, 315, 316, 407.1, 231, 245, 246; 24/573, 648, 657; 74/489, 488

[56] References Cited

U.S. PATENT DOCUMENTS

| 2,565,605 | 8/1951 | Grayson | 24/114.5 |
|---|---|---|---|
| 2,574,579 | 11/1951 | McCoy et al. | 403/315 |
| 3,006,674 | 10/1961 | Becker | 403/58 |
| 3,044,812 | 7/1962 | Giovinazzo | 403/79 |
| 3,414,304 | 12/1968 | Miller | 403/408.1 |
| 4,304,146 | 12/1981 | Ueda | 74/489 |
| 4,308,761 | 1/1982 | Shimano | 403/316 |
| 4,316,531 | 2/1982 | Harpster | 74/489 |
| 4,599,011 | 7/1986 | Tashiro et al. | 403/407.1 |

FOREIGN PATENT DOCUMENTS 2093551  9/1981  United Kingdom ............... 403/405

Primary Examiner—Cornelius J. Husar
Assistant Examiner—Peter M. Cuomo
Attorney, Agent, or Firm—Sixbey, Friedman & Leedom

[57] ABSTRACT

A wire coupling device for connecting a displacement-transmitting wire therein is formed by engagement of two wire engaging members, wherein a first engaging member is entered through pivotal holes and then a second engaging member is inserted into a hollow cylinder of the first member, thereafter the two members are circumferentially turned to coincide respective notched grooves, thus the wire coupling device is formed. To the formed device, a wire terminal nipple is connected to serve as a wire coupling in a brake system of a bicycle, wherein the first member and the second member are integrally engaged and are adapted to turn in pivotal holes. Further the invention prevents possible disengagement of the connected nipple by way of turning the two engaged members relatively for about 180 degrees to cross over the grooves and openings provided on the members so that the nipple is enclosed in the wire coupling device.

8 Claims, 13 Drawing Figures

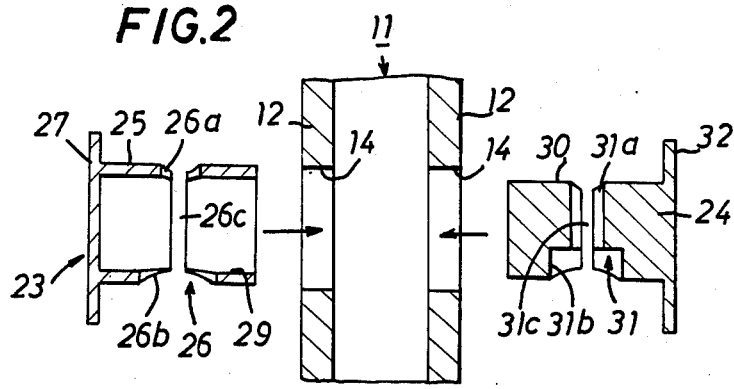
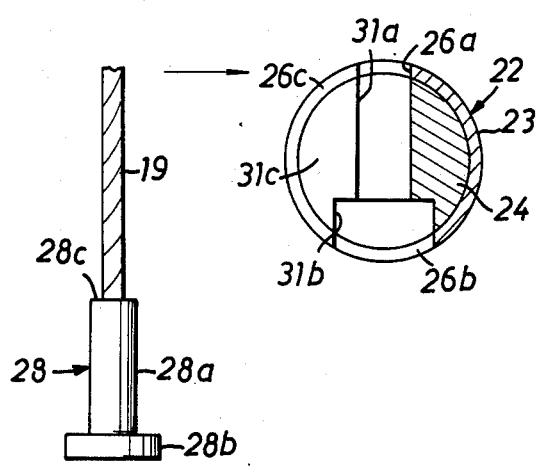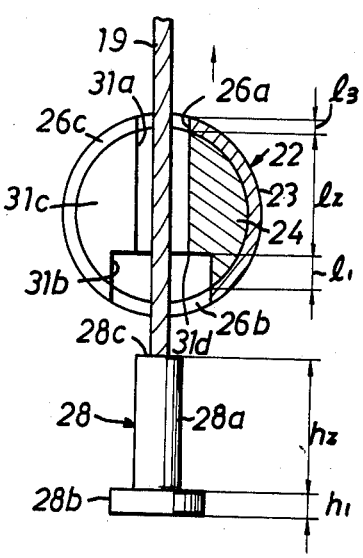

DEVICE FOR CONNECTING A WIRE WITH A COUPLING IN AN OPERATIVE ASSEMBLY OR IN AN ACTUATIVE ASSEMBLY FOR BICYCLE OR THE LIKE

FIELD OF THE INVENTION AND DESCRIPTION OF THE RELATED ART

This invention relates to improvement in a device for connecting a displacement-transmitting wire at its terminal nipple with a coupling in an assembly provided for manually operating a brake system or in an assembly provided for mechanically actuating a brake system for use in a bicycle or the like.

A conventional prior art is explained by an accompanying drawing FIG. 9 which shows perspectively a process for mounting a wire engaging member to a manually operative lever to operate a brake system for a bicycle, wherein 1 represents a lever lying at a stage in manufacturing process thereof or at in-process stage (drawn in solid lines) with partial modification which will be realized at finishing stage thereof (drawn in imaginary, two-dot lines). The operative means or lever 1 consists of a pair of opposite walls integrally connected by a curvature and thereon a pair of pivotal holes 3,3 are formed therein, which should be finished with accurate alignment for the purpose of receiving the two ends of a wire engagement member 4 therein. The wire engagement member 4 has a cylindrical body 5 which is much larger than the holes 3,3 and has also two oppositely projecting, short pivot arms 6,6 which are sized to fit in the holes 3,3 and length of the member 4, denoted by L, should be adequate in relation to a distance W so as to make a bridge between two the walls 2,2, the distance W being made shorter by press work deforming walls 2,2 from their original position (solid lines) into their finished position (phantom lines). Further, the member 4 is, on its cylinder, provided with a diametric through-hole to hold or accommodate a terminal nipple part of an inner wire which will serve as a transmission line between a manual operation assembly and a mechanical actuation assembly. As is understood, the engagement member 4 is bridged or mounted between the walls 2,2 by inserting its two arm ends 6,6 into the pivotal holes 3,3.

Making reference to how the engagement member 4 is fitted or mounted to the lever 1; when the two walls 2,2 are press-shaped in the manufacturing process to take a V letter shape, like a configuration drawn in solid lines, a piece of the engagement member 4 is held and approached to the holes 3,3 (the direction is noted by an arrow mark) so that its either one arm 6 is inserted into one of the holes 3,3, then, as the walls 2,2 are further pressed, the other arm 6 thereof is inserted into the other remaining hole 3 to finish so that the two walls become substantially parallel or U letter shape like a position indicated by the phantom lines.

However, as is understood by the explanations above, fitting work of the engaging member 4 can not be done after the two walls come to the U letter position, which follows that the necessary fitting work should be started in the process of manufacture or at an intermediate stage where the two walls are in the V letter configuration, which fact produces a disadvantage in that it is necessary to suspend continuous operation of the manufacturing line.

Further, according to the conventional way of fitting the engagement member 4 to the lever 1, the pivotal holes 3,3 should be formed to be considerably larger than the size of the two arms 6,6, allowing for possible deformation and shrinkage in size during subsequent course from the V to the U stage. Therefore, the engagement member 4 at its finished stage cannot avoid having a large clearance around its arms 6,6 at the holes 3,3 so that the problem of having a loose pivot may not be avoided as a result.

In addition, where the conventional engagement member 4 is assumed to be applied in a lever means, by which a vehicular rider will operate a brake system on his bicycle, loose status of the inner wire or loss of elastic recovery potential with a spring incorporated in an actuative end is possible to take place, and should such be the case, a conventional device for connecting the wire with the engagement member might cause unexpected disengagement or disconnection of the wire, which brings disenablement of actuating the brake as well as dangers accompanied therewith.

OUTLINE AND PURPOSE OF THE INVENTION

The first purpose of the invention is to avoid suspension of continuous works which is undesirable in an automatic manufacture line, by changing structure of the conventional wire engagement member so as to be suitable to be mounted to an operative or actuative device after manufacture thereof.

The second purpose of the invention is to prevent formation of unnecessary clearance at the pivotal holes with the wire engagement member as is noted above.

Further, the third purpose of the invention is to provide means for assuring safety of the operative device and/or actuative device by preventing a wire terminal from unexpected disengagement or release out of connection, on account of loosening by creep elongation of wire or other causes.

The first and second purposes noted above will be accomplished in the invention by employing a finished operative or actuative device provided with a pair of pivotal holes which are respectively formed therein in alignment to serve as pivot, will be mounted with a wire coupling device comprising combination of two engagement members, to which a wire will be connected.

Said engagement members consist of a first member and a second member, wherein the first is a hollow, cylindrical member having an end wall portion and having a diameter that is slightly smaller than the pivotal hole to gain insertability and is provided with a peripheral flanged portion formed adjacent to the end wall portion to fit on a respective one of the walls of the operative or actuative device and also provided with a diametrically notched groove in the middle of the cylindrical member in the direction perpendicular to the longitudinal axis of the cylindrical member, and wherein the second member is a solid cylindrical member having a diameter slightly smaller than the hollow diameter of the first member to gain insertability therein and provided with a peripheral flanged portion which fits on a respective wall of the device and is also provided with a diametrically notched groove in the middle of the cylindrical member in a direction perpendicular to the longitudinal axis of the cylindrical member so as to align to the same with the first member. Then, the second member is inserted into the hollow cylindrical member to make a bridge between the pair of pivotal holes, and then, respective grooves are coincided between two overlying cylindrical surfaces, thereby an aligned groove space is obtained, into which a wire terminal nipple is accommodated to form a coupling.

The third purpose noted above will be accomplished by adding a further feature to the devices as noted in connection with the first and second purposes. That is, after aligning the two notched grooves and engaging the wire nipple therewith, the first outer member is adapted to turn on the inner second member for 180 degrees along the groove or circumferentially, which will break the alignment and close a larger opening for incoming or outgoing of the nipple base.

BRIEF DESCRIPTION OF THE DRAWINGS

FIG. 2 is a vertical, sectional drawing to show how two members of the invention are going to engage each other through walls.

FIG. 3A through FIG. 3E are elevational, sectional drawings to illustrate sequential steps when a wire terminal nipple is being engagement or coupled with combination of the two engaging members.

It is to be noted here that these drawings are presented by way of illustrating the inventive embodiments, therefore, the accompanying drawings should not be construed as limiting the invention.

DETAILED DESCRIPTION OF THE PREFERRED EMBODIMENT OF THE PRESENT INVENTION

The invention will be detailed in the following with reference to FIGS. 1 through 8, wherein like parts bear like numerals or common denotations.

Figure 1:
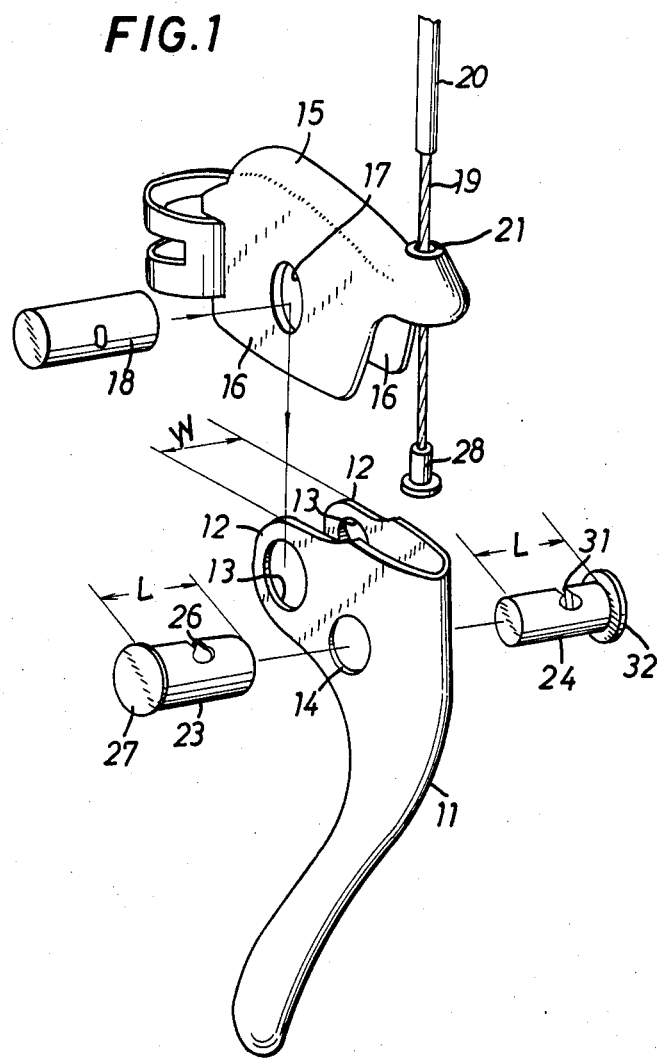
FIG. 1 is a perspective, exploded view showing connections, including connection of a wire with a coupling, of participating elements belonging to a brake lever assembly of the invention which will serve as a manually operative device in a bicycle.
Figure 9:
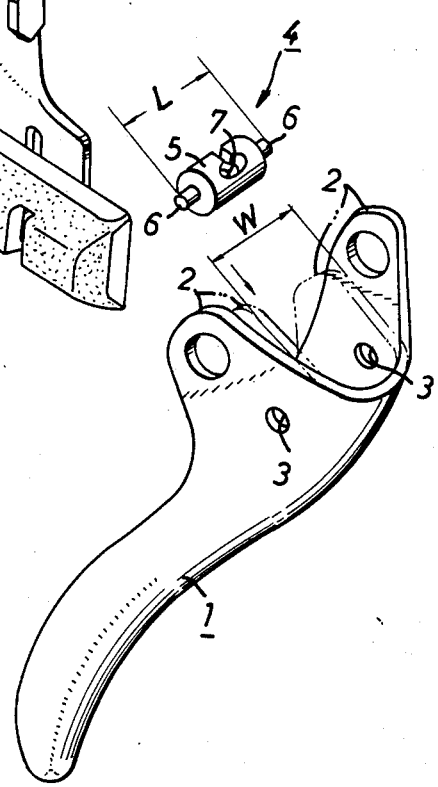
FIG. 9 is a perspective drawing to show a conventional wire engaging member and related elements in connection with a process where the engagement member is mounted to a lever means in a bicycle.

In FIG. 1, 11 is a lever, similar to the lever shown in FIG. 9, which takes U letter shape and is provided with a pair of opposite walls 12,12, on which a pair of pin shaft holes 13,13 are formed in alignment at respective wall edges and a pair of pivotal holes 14,14 (one of them is not seen) to let through wire engaging members 23,24 are also formed in alignment at respective wall bases. 15 is a housing which will be fitted over the walls 12,12 so that a pair of holes 17,17 formed on the walls 16,16 of the housing 15 may be aligned to the holes 13,13 on the walls 12,12 of the lever 11, as a downward arrow mark indicates, and another pin shaft 18 is entered therethrough, as another lateral arrow mark indicates, so that the lever 11 may be manually turned or moved about the pin shaft 18 with respect to the housing 15, which is further provided with a wire hole, vertically seen, for an inner wire 19 to be allowed to run through and to terminate with a nipple 28, wherein around the wire hole is a hole rest 21 to receive the end of an outer wire 20. These arrangements noted above are not novel, but conventional.

Then, as will be apparent hereinlater, two wire engagement members 23,24 (generally fabricated of metal or hard plastic), will be engaged to form a wire coupling device of the invention. As FIG. 1 and following drawings show, the first member 23 is a hollow cylindrical member having outer diameter 25 (see FIG. 2) that is slightly smaller than the hole 14 to gain insertability and pivotal action. Further the first member 23 is provided with a diametrically notched groove 26 in the middle of the cylindrical member in the direction perpendicular to its longitudinal axis and the peripheral flange 27 adjacent an end of member 23, is adapted to rest on the outside of either wall 12, wherein the cylinder lenght (L) is made equal or slightly shorter than the distance (W) between outsides of respective walls 12,12. The configuration of the notched groove 26 is disposed, for complete engagement in cooperation with the second member, to conform to the configuration of the nipple 28 which consists of a cylindrical stand 28a integrated with a circular base 28b, as shown in FIGS. 2 and 3. Therefore, the notched groove 26 is made to have a complementary configuration by defining a relatively large hole 26b to accommodate the base 28b and a relatively small hole 26a to accommodate the stand 28a and a groove 31c to let through the inner wire 19 (see FIG. 3A).

The second member 24 is a bottom-flanged, solid cylindrical member that is slightly smaller in diameter than the cylindrical hollow of the first member 23 to gain insertability therein, further the second member 24 is provided likewise with a diametrically notched groove 31 in the middle of the cylindrical member in the direction perpendicular to its longitudinal axis so as to align to the same on the first member 23 and the flange 32 is adapted to rest on the outside of either wall 12, wherein the cylinder length (L) is, as with the first member, made equal or slightly shorter than the distance (W) between outsides of respective walls 12,12. The configuration of the notched groove 31 is disposed, for complete engagement in cooperation with the first member, to conform to the configuration of the nipple which consists, as shown in FIGS. 2 and 3, of a stepped cylinder. Therefore, the notched groove 31 is likewise made to to be of a complementary configuration to the nipple 28 by defining a relatively large opening and recessed part 31b to accommodate the base 28b, and a relatively small opening and bore 31a to accommodate the stand 28a, with a groove 31c to receive the inner wire 19.

Figure 3C:
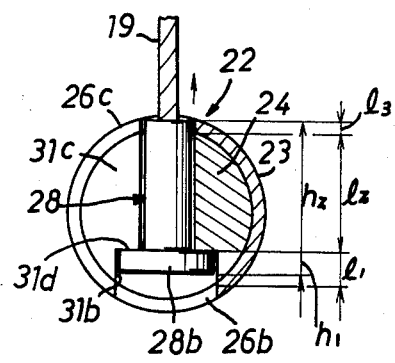

In the above, the dimensional relationship between the wire terminal nipple 28, the notched groove 26 and the groove 31 are illustrated in FIGS. 3B and 3C, wherein some relations will be formulated, if appropriate denotations are assumed as below;

The nipple, height of the base part: $H1$.
The nipple, height of the stand part: $H2$.
The second member, height of large recessed part: $L1$.
The second member, height of small bore part: $L2$.
The first member, thickness of cylinder wall or pierced large and small holes: $L3$.
Formulas obtained are;

$$L1 + L2 = H1 + H2.$$

$$L3 = L1 - H1.$$

Now, reference will be made to the process or sequential steps of fitting the engagement members 23,24 to the operative device 11 and of connecting the wire terminal nipple 28 with the combination of engagement members 23,24, according to FIG. 2 and FIGS. 3A through 3E.

FIG. 2 shows a sectional inside view of the lever 11, in the middle, and two members 23,24, at both sides, and engaging steps are explained that the first step is to enter the first member 23 through the hole 14 on the wall 12, on which the flange 27 of the first member 23 will be rested. Likewise, the second member 24 is then inserted into the already rested first member 23 through the opposite hole 14 in the opposite direction to the first, thereby the second member 24 will be rested on the wall 12 with its flange 32. Thereafter, either one of the first 23, outer side, or the second, inner side, is turned along the overlying grooves 26c, 31c to reach coincidence of the two grooves 26c and 31c, and the openings of 26b and 31b or 26a and 31a, whereby engagement of the two members 23,24 is complete, which state is sectionally shown in FIG. 3A.

Next, connection of the wire terminal nipple 28 with the engaged members 23,24 or in other words, a wire coupling device, represented by 22, is explained in FIGS. 3A-3C. As FIG. 3A shows, the engaged members 22 are disposed so that the coincided notched grooves 26,31 may face outward between the two walls 12,12 (see FIG. 1) with the larger opening 26b,31b under and the smaller opening 26a,31a over, while the nipple 28 is held in air, as seen in FIG. 1 in such a way that level of the nipple top 28c comes under the opening 26b,31b. And the wire 19 is moved with vertical holding (direction of move is indicated by an arrow mark in FIG. 3A) and put into the groove 26,31, as seen in FIG. 3B, then the wire will be pulled up to engage with the members 23,24, making use of stepped configuration 31d, which is seen in FIG. 3C. Specifically, the nipple base 28b is engaged with the step 31d between the large recessed part 31b and the small bore 31a, further the nipple top 28c is engaged with the smaller opening 26a of the first member 23. It is to be noted here that force of pulling the nipple in service comes generally from a spring device (not shown) provided at far end of the wire 19 or a brake actuating assembly.

Figure 3D:
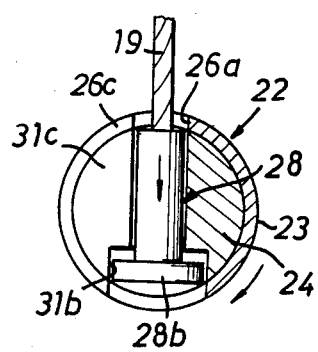
Figure 3E:
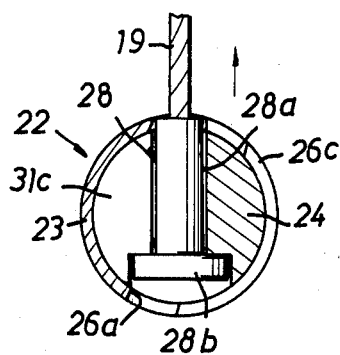
Figure 4:
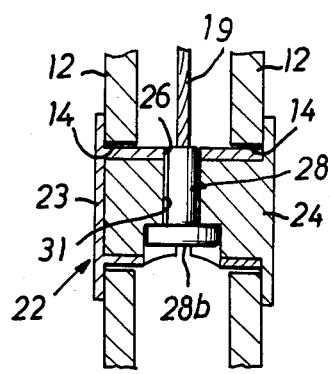
FIG. 4 is a vertical sectional drawing, viewed with a different angle, which corresponds to a status shown by FIG. 3C.
Figure 5:
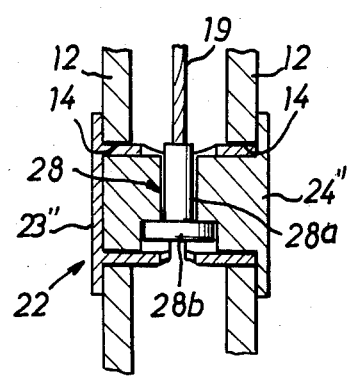
FIG. 5 is a like drawing which corresponds to FIG. 3E.

The wire connection obtained in the above is considered to be comparable to a conventional device shown in FIG. 9. Thus, the embodiments above will be accepted as useful in practical applications. However, the present invention comprises utility of adding further features besides those described above. That is, the two engagement members 23,24, forming the wire coupling 22, are so disposed that the two cylindrical members may be relatively turned circumferentially to enclose the nipple 28 therein. This feature is shown in FIG. 3C to FIG. 3E, wherein, first, the wire 19 is slightly pulled down, resisting to pull-up force, to obtain the status of FIG. 3D, then the first member 23 is turned clockwise (see an arrow mark therein) for about 180 degrees and again the wire is let under pull-up status as FIG. 3E shows. (It is to be noted here that FIG. 4 shows an equivalent status to FIG. 3C from a different view angle or view from left to right on the paper, and that FIG. 5 shows a view of FIG. 3E likewise from left to right.) Comparing the status of FIG. 3C wherein the two grooves are coincided or open, with FIG. 3E wherein the two grooves are crossed over to be opposite or reciprocal, such consequence will be understood that the nipple 28 is enclosed in the space in the engaged members 22 by covering the open groove with non-grooved wall. If removal of the nipple 28 out of the enclosure is desired, the steps from FIG. 3E to FIG. 3C are reversed.

Figure 6:
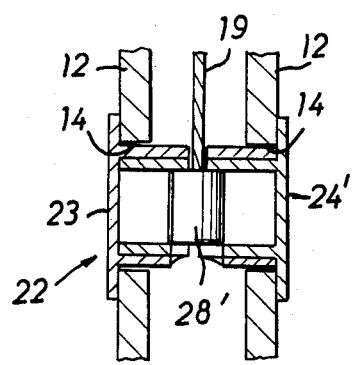
FIG. 6 and FIG. 7 are vertical, sectional drawings to show other embodiments with like concept as shown in FIG. 1.
Figure 7:
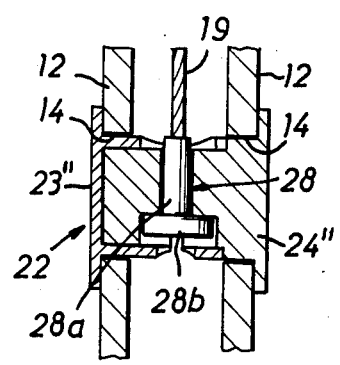

FIG. 6 and FIG. 7 relate to other modified embodiments of the wire coupling represented by 22. In FIG. 6, the second member 24' is a hollow cylindrical member like the first member 23 and the nipple 28' is of simple, non-stepped cylinder, wherein the nipple 28' is not enclosed like in FIG. 4. The manner of assembling the wire coupling shown in FIG. 4 is substantially equal to descriptions above. FIG. 7 shows the enclosed status like in FIG. 5 wherein, however, the first member 23'' is slightly short or not long enough to reach the opposite wall and the second member 24'' is shaped to rest itself directly on the pivotal hole 13 pierced on the wall 12, but for this point, the embodiment is substantially equal to the one shown in FIG. 4 and FIG. 5.

Figure 8:
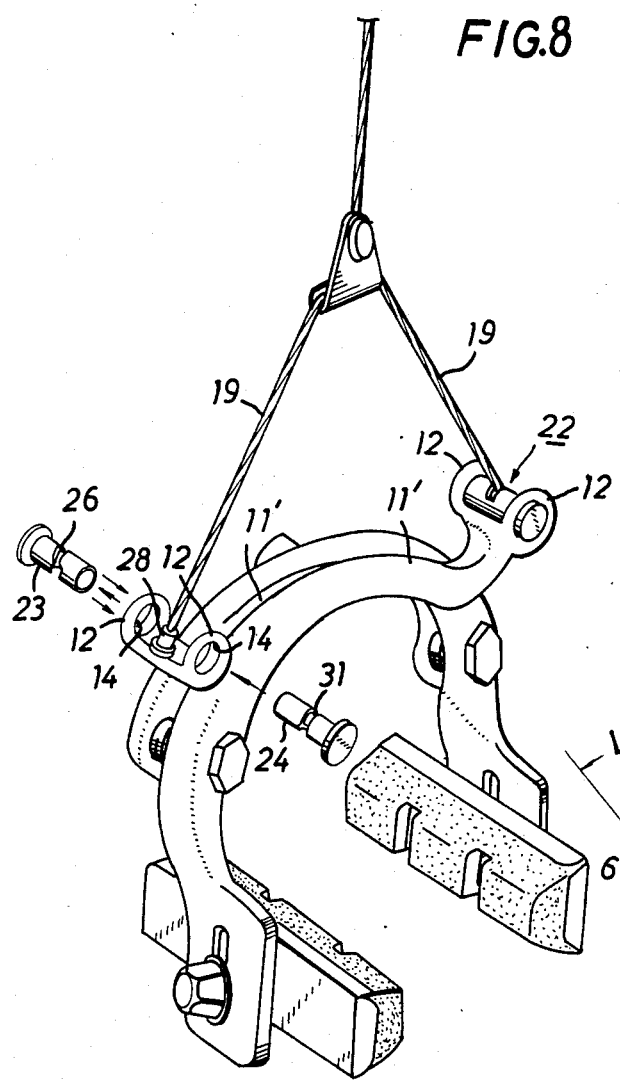
FIG. 8 is a partially disassembled, perspective drawing to show an embodiment where the inventive coupling is applied to a mechanically actuative assembly for a center pull brake assembly in a bicycle.

FIG. 8 illustrates application of the invention in an assembly for mechanically actuating a brake or in a far end from the manual lever, with a perspective view wherein the inventive devices are incorporated in two actuating arches in a center-pull brake system for a bicycle and wherein like numerals or denotations are equivalent to those used in FIG. 1 and combination of participating elements is also substantially the same as in FIG. 1, therefore, further description of FIG. 8 is herein abbreviated.

In above descriptions so far, the invention has been explained by embodiments used in brake lever assembly for manual operation or in brake mechanism actuation for use in a bicycle. However, application of the invention is not limited with bicycles, but also in motorcycles and agricultural vehicles.

In essence, the present invention offers convenience of mounting a wire coupling device 22 to operative or actuative devices 11, 11' after finishing thereof, thereby avoiding disadvantage of suspending press works in manufacture thereof. Further, bearing adjustment between the pivotal hole 14 and the wire coupling 22 is improved, obviating formation of unreasonable clearance, because the wire coupling of the invention is formed by two members 23,24, one is inserted into the other so that very slight clearance may be worked out.

In addition, the invention provides special art, by which the wire terminal nipple 28 is enclosed in the space of the wire coupling device. Therefore, unexpected disconnection or release of the nipple 28 is prevented and, in return, high safety is assured.

I claim:

1. Device for connecting a wire with a coupling in an assembly for a bicycle or the like, said assembly being provided with a pair of walls, whereon a pair of pivotal holes are respectively formed therein and in alignment, and whereto a wire coupling device is mounted;
    said wire coupling device comprising a first engagement member and a second engagement member being engaged with each other; wherein said first engagement member comprises a hollow, cylindrical member having an end wall portion and having a diameter that is slightly smaller than a diameter of the pivotal hole to gain insertability and is provided with a peripheral flange portion formed adjacent to said end wall portion to fit on a respective one of the walls, a diametrically notched groove formed in an axially central portion of the cylindrical member which opens and extends in directions perpendicular to a longitudinal axis of the cylindrical member, and wherein said second engagement member comprises a solid cylindrical member having a diameter that is slightly smaller than the inner diameter of said first member to gain insertability, is provided with a peripheral flange portion which fits on a respective one of the walls, a diametrically notched groove formed in an axially central portion of the solid cylindrical member which opens and extends in directions perpendicular to the longitudinal axis of the solid cylindrical member so as to be aligned with the notched groove of said first member, said solid cylindrical member being inserted into the hollow cylindrical member to make by engagement a bridge between the pair of pivotal holes, the aligned grooves of the first and second members providing an aligned groove space through which a wire terminal nipple may be accommodated to form a connection of the wire with the coupling with the wire and nipple being oriented diametrically with respect to the first and second engagement members.

2. Device for connecting a wire with a coupling as defined in claim 1, wherein the wire terminal nipple is shaped in a stepped configuration comprising large and small cylindrical portions, and the solid cylindrical member is provided with respective openings for receiving the large and small cylindrical portions.

3. Device for connecting a wire with a coupling as defined in claim 1, wherein the wire terminal nipple is shaped in a columnar configuration.

4. Device for connecting a wire with a coupling as defined in claim 1, wherein the first engagement member and the second engagement member are each in direct contact on surfaces of a respective one of the pivotal holes.

5. Device for connecting a wire with a coupling in an assembly for a bicycle or the like, said assembly being provided with a pair of walls, whereon a pair of pivotal holes are respectively formed therein and in alignment, and whereto a wire coupling device is mounted;

said wire coupling device comprising a first engagement member and a second engagement member being engaged with each other; wherein said first engagement member comprises a hollow, cylindrical member having an end wall portion and a diameter that is slightly smaller than a diameter of the pivotal hole to gain insertability and is provided with a peripheral flange portion formed adjacent to said end wall portion to fit on a respective one of the walls, a diametrically notched groove formed in a central portion of the cylindrical member which opens and extends in directions perpendicular to a longitudinal axis of the cylindrical member, and wherein said second engagement member comprises a solid cylindrical member having a diameter that is slightly smaller than the hollow diameter of said first member to gain insertability and is provided with a peripheral flange portion which fits on the wall, a diametrically notched groove formed in a central portion of the solid cylindrical member which opens and extends in directions perpendicular to the longitudinal axis of the solid cylindrical member so as to be alignable with the notched groove of said first member;

said solid cylindrical member being inserted into the hollow cylindrical member to make by engagement a bridge between the pair of pivotal holes, a wire terminal nipple being accommodated in a groove space, formed by the first and second members, to form a connection of the wire with the coupling;

the grooves being relatively turned for about 180 degrees circumferentially, from a position where the grooves are aligned to a position where the respective grooves are oppositely disposed, so that the accommodated wire terminal nipple is enclosed in the wire coupling.

6. Device for connecting a wire with a coupling as defined in claim 5, wherein the wire terminal nipple is shaped in a stepped configuration comprising large and small cylindrical portions, and the solid cylindrical member is provided with respective openings for receiving the large and small cylindrical portions.

7. Device for connecting a wire with a coupling as defined in claim 5, wherein the wire terminal nipple is shaped in a columnar configuration.

8. Device for connecting a wire with a coupling as defined in claim 5, wherein the first engagement member and the second engagement member are each in direct contact on surfaces of a respective one of the pivotal holes.

* * * * *